May 28, 1963 G. P. FELTS 3,091,749
CONNECTOR DEVICE
Filed June 1, 1959
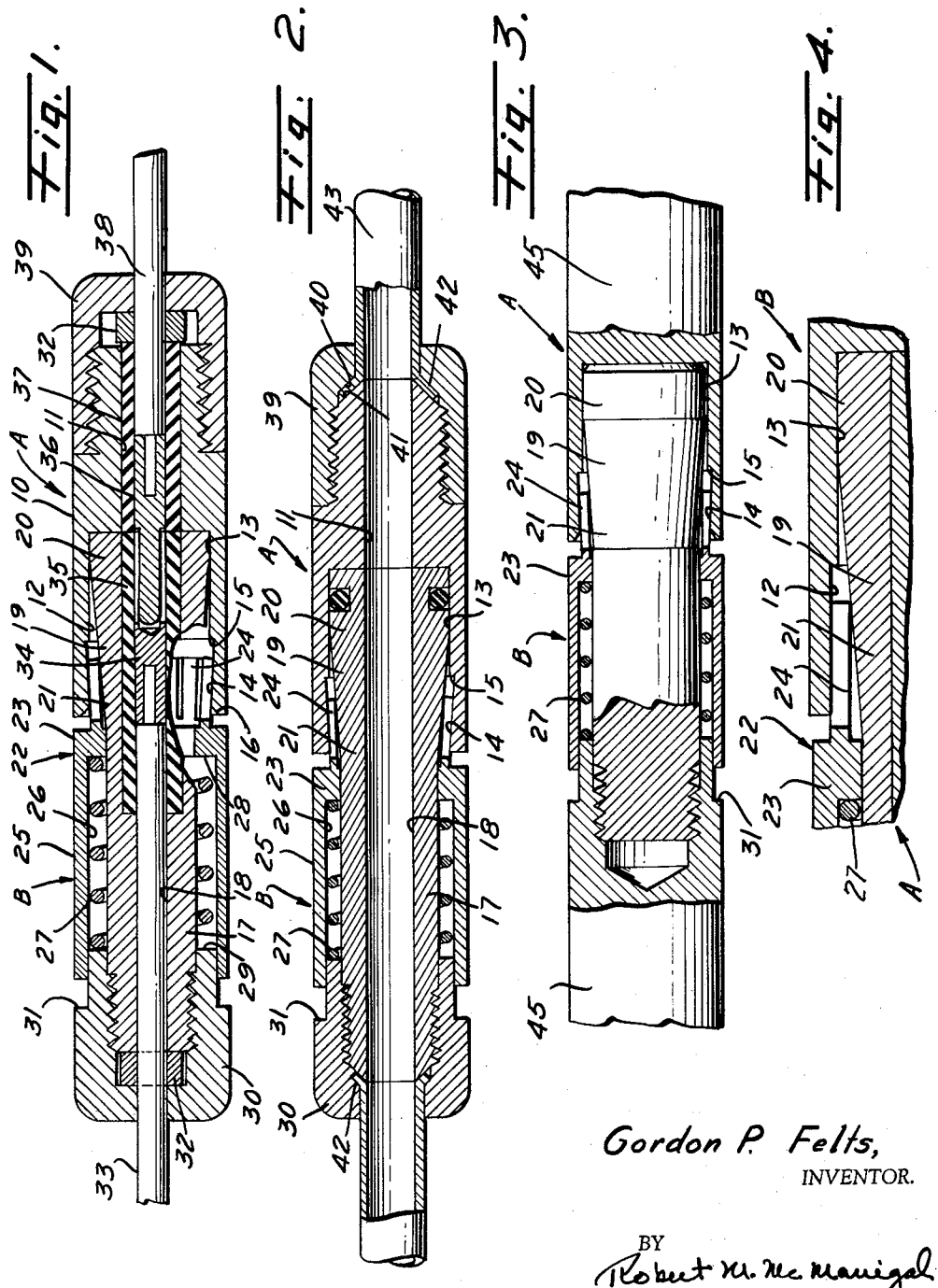
Gordon P. Felts,
INVENTOR.
BY Robert M. McManigal
Attorney United States Patent Office 3,091,749
Patented May 28, 1963

3,091,749
CONNECTOR DEVICE
Gordon P. Felts, Palm Springs, Calif., assignor to Microdot Inc., South Pasadena, Calif., a corporation of California
Filed June 1, 1959, Ser. No. 817,164
2 Claims. (Cl. 339—75)

The present invention relates generally to connecting devices for use in securely interconnecting elements in end-to-end relation, and is more particularly concerned with connectors of the two-part type which may be utilized for releasably interconnecting electrical conductors, fluid conduits, rods, and the like.

It is one object of the present invention to provide a two-part connector of universal application which is of simple construction and may be utilized for releasably interconnecting electrical conductors, fluid conduits, rods, and the like.

A further object is to provide such a connector which is susceptible of quick automatic connection by the simple expedient of pushing the two-parts of the connector together.

Still another object is to provide a universal connector of simple construction having a rupturing failure of an extremely high order, and wherein locking fingers are put into compression rather than in tension to prevent separation of the connector parts.

Further objects of the invention will be brought out in the following part of the specification, wherein detailed description is for the purpose of fully disclosing the invention without placing limitations thereon.

Referring to the accompanying drawings, which are for illustrative purposes only:

FIG. 1 is a longitudinal section, with parts shown in elevation, of an electrical connector embodying the features of the present invention;

FIG. 2 is a similar view showing the invention applied to a connector for fluid conduits;

FIG. 3 is a similar view showing the invention applied to a connector for rods, cable and the like; and FIG. 4 is a fragmentary view of a modified construction.

Referring generally to the drawings, the invention is illustrated in FIG. 1 as being applied to an electrical connector of two-part construction comprising a part A and a part B of elongate construction which are arranged for connection in end-to-end relation.

More specifically, the part A comprises an elongate tubular member 10 of metallic material and formed in this case with a central axially extending bore 11 in communication with an end opening socket 12. This socket is shown as having an inner wall portion 13 of cylindrical configuration extending from the bottom of the socket. At the open end of the socket, the inner wall comprises a frusto-conical section 14 which is of substantially the same diameter as the cylindrical wall 12 at the mouth of the socket, this frusto-conical wall being of gradually increasing diameter to a point substantially midway of the socket, where it terminates in a radial shoulder 15. The outermost edge of the frusto-conical wall portion is chamfered as indicated at 16.

The part B is likewise formed of an elongate tubular member 17 constructed with a central axially extending bore 18, and is provided at one end with an end head portion as generally indicated at 19 which terminates in a cylindrical end section 20, and is further inwardly from the end provided with a portion 21 having in this case a conical outer surface of increasing diameter in a direction towards the cylindrical portion 20.

From the previous description, it will be observed that the socket 12 of the part A forms in effect a female member for receiving the head portion or male member of the part B. With the head portion inserted into the socket, the cylindrical outer surface of the portion 20 will be seated in the cylindrical inner wall portion 13 of the socket, and the conical portion 21 will lie opposite the frusto-conical inner wall portion 14 of the socket. It will be observed that the angle of the conical portion 21 is slightly greater than the angle of the frusto-conical inner surface 14 of the socket.

Associated with the tubular member 17 is a locking member 22 which is reciprocably mounted on the tubular member 17. The locking member is constructed with a body portion 23 having sliding engagement with the outer surface of the tubular member 17. On one side of the body 23 are provided a plurality of projecting circumferentially spaced fingers 24 which are of a resilient material and are deflected outwardly as their ends are approached. On the opposite side, the body 23 is provided with an elongate cylindrical portion 25 having an inner diameter greater than the outer diameter of the adjacent tubular member 17 so as to provide a circumferentially concentric space 26 within which there is mounted a compression spring 27, one end of this spring bearing against a shoulder 28 at the body portion 23, and the other end bearing against the inner end edge 29 of an end cap 30 in threaded engagement with the outermost end of tubular member 17. The adjacent end of the cylindrical portion 25 slidably engages the adjacent end of the end cap and is arranged to move against the action of the spring 27 until limited by an abutment shoulder 31 formed on the end cap. Under the biasing action of the spring, the locking member may move in the opposite direction until restrained by the engagement of the body 23 with the adjacent end of the conical portion 21.

Retained within the bore 18 by a clamping ring 32 is an electrical conductor 33 which is connected to a female contact member 34 contained within an insulating sleeve 35 and adapted to separably receive a male contact member 36 carried by the part A and insulatingly supported therein by an insulating sleeve 37. The male contact member is connected with a conductor 38 which is similarly held by a clamping ring 32. This end of the part A is similarly provided an end cap 39.

The operation of the connector described above will now be described.

The parts A and B are connected in end-to-end relation by telescopically connecting the parts. The end head portion 19 is inserted into the socket, and as the parts are pushed together, the spread fingers 24 are first engaged by the chamfer 16 which pushes the locking member towards the abutment shoulder 31 as the head portion moves into seated position in the socket, and the male and female connectors are engaged. Upon engagement of the locking member with the abutment shoulder 31, the fingers 24 are deflected inwardly by the chamfer 16, thus enabling the spring 27 to snap the locking member into locking position and cause the fingers 24 to ride up on the surface of the conical portion 21 into a position between this surface and the inner frusto-conical surface 14 until the tip ends of the fingers are wedged between the surfaces. The parts A and B are now interlocked securely together.

With the parts A and B locked together, relative movement of the parts in an endeavor to separate these parts and disconnect the contacts therein will cause the ends of the fingers 24 to be subjected to compressive forces, and due to the camming action of the outer surface of the conical portion 21 will maintain the fingers in engagement with the frusto-conical surface 14 and prevent the head portion from being withdrawn from the socket 12 until the locking member 22 is withdrawn against the spring 27 so as to withdraw the fingers 24 from locking position between the inclined surfaces of the head portion and the socket inner wall. With the locking member in released position, the parts A and B may be easily separated and the electrical contacts disconnected.

Referring now to the embodiments as shown in FIGS. 2 and 3, similar numerals are used to indicate like parts which correspond to the connector shown in FIG. 1. The embodiment shown in FIG. 2 may be utilized for interconnecting fluid conduits in which case the end caps 30 and 39 are provided with an inner bevelled surface 40 which cooperates with a bevelled end surface 41 on the end of the connector part for clampingly engaging the flared end 42 of a connected conduit 43. The bores 11 and 18 form conducting channels in this case within the parts A and B and in order to seal the parts against leakage in connected relationship of the parts, the head portion 19 is provided with an O-ring sealing gasket. The operation of the parts is the same as previously described for the electrical connector.

In the embodiment shown in FIG. 3, the connecting elements are the same basically as described previously, and operate in the same manner. In this embodiment, however, the parts are formed at the ends of rods 45—45, and the parts A and B are of solid construction rather than tubular. While the connector as thus formed may be used to secure rods in end-to-end relation, such as sucker rods, fishing rods, etc., it will be appreciated that the parts A and B may be connected to flexible cables or other members of such character by having them secured to the cable ends in a manner well understood in the art.

Referring now to FIG. 4, there is shown a modified connector arrangement in which the frusto-conical surface 14 of the socket 12 has been omitted. In this case the entire inner wall is comprised of the cylindrical surface 13. With this construction, the parts A and B may be separated simply by holding part A and pulling on the locking member 22. In the other constructions previously described, parts A and B could only be separated by holding part B and pulling the locking member 22 back until the fingers 24 were moved to non-wedging position. Parts A and B could then be separated.

From the foregoing description, it is believed that the designated objects have been accomplished.

Various modifications may suggest themselves to those skilled in the art without departing from the spirit of my invention, and hence, I do not wish to be restricted to the specific forms shown or uses mentioned, except to the extent indicated in the appended claims.

I claim:

1. A two-part connecting device, comprising: a first part having an end opening socket with an inner wall portion of uniform diameter adjacent its bottom end and an inner wall portion adjacent its open end of inwardly increasing diameter; a second part having an end portion adapted for endwise insertion into a seated position in said socket, said end portion having a circumferential wall portion adapted to circumferentially slidingly enter the wall portion adjacent the bottom of said socket and an inclined circumferential wall portion adapted to face the inner wall portion adjacent the open end of said socket; a sleeve member inwardly of said end portion supported on said second part for reciprocable axial movements thereon and being biased towards said inclined circumferential wall; and fingers carried by said sleeve member adapted to wedge under its biased movement between said inclined circumferential wall and the inner wall portion adjacent the open end of said socket.

2. A two-part connecting device, comprising: a first part having an end opening socket with an inner wall portion of uniform diameter adjacent its bottom end and an inner wall portion adjacent its open end of inwardly increasing diameter; a second part having an end portion adapted for endwise insertion into a seated position in said socket, said end portion having a circumferential wall portion adapted to circumferentially slidingly enter the wall portion adjacent the bottom of said socket and an inclined circumferential wall portion adapted to face the inner wall portion adjacent the open end of said socket; electrical contacts insulatingly supported in said parts and adapted for separable interconnection when said portion is seated in said socket; a sleeve member inwardly of said end portion supported on said second part for reciprocable axial movements thereon and being biased towards said inclined circumferential wall; and fingers carried by said sleeve member adapted to wedge under its biased movement between said inclined circumferential wall and the inner wall portion adjacent the open end of said socket and acting to oppose separation of said parts and disconnection of said contacts.

References Cited in the file of this patent

UNITED STATES PATENTS

| | | |
|---|---|---|
| 1,169,693 | Swedlund | Jan. 25, 1916 |
| 2,396,901 | Tiffany | Mar. 19, 1946 |
| 2,439,744 | Mentor | Apr. 13, 1948 |
| 2,784,987 | Corcoran | Mar. 12, 1957 |
| 2,877,437 | Flanagan | Mar. 10, 1959 |

FOREIGN PATENTS

| | | |
|---|---|---|
| 105,227 | Great Britain | Feb. 14, 1918 |